United States Patent
Natvig et al.

(10) Patent No.: US 11,657,052 B2
(45) Date of Patent: *May 23, 2023

(54) DUAL FILTER HISTOGRAM OPTIMIZATION

(71) Applicant: Medallia, Inc., San Francisco, CA (US)

(72) Inventors: Thorvald Natvig, Palo Alto, CA (US); Santiago Perez, Buenos Aires (AR)

(73) Assignee: Medallia, Inc., San Francisco, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/245,556

(22) Filed: Apr. 30, 2021

(65) Prior Publication Data

US 2021/0248142 A1 Aug. 12, 2021

Related U.S. Application Data

(63) Continuation of application No. 16/266,985, filed on Feb. 4, 2019, now Pat. No. 10,997,172, which is a continuation of application No. 15/608,411, filed on May 30, 2017, now Pat. No. 10,242,055.

(60) Provisional application No. 62/431,345, filed on Dec. 7, 2016.

(51) Int. Cl.
*G06F 16/2453* (2019.01)
*G06F 16/22* (2019.01)

(52) U.S. Cl.
CPC .... *G06F 16/24542* (2019.01); *G06F 16/2255* (2019.01)

(58) Field of Classification Search
CPC ............... G06F 16/24542; G06F 16/2255

USPC ......................................................... 707/718
See application file for complete search history.

(56) References Cited

U.S. PATENT DOCUMENTS

| | | | | |
|---|---|---|---|---|
| 6,714,938 | B1 * | 3/2004 | Avadhanam | G06F 16/24542 |
| | | | | 707/999.102 |
| 8,229,917 | B1 * | 7/2012 | Aneas | G06F 16/24545 |
| | | | | 707/713 |
| 9,678,999 | B1 * | 6/2017 | Gibas | G06F 16/24545 |
| 9,977,807 | B1 * | 5/2018 | Bowman | G06F 16/381 |
| 11,210,279 | B2 * | 12/2021 | Kachemir | G06F 7/24 |
| 2010/0088315 | A1 * | 4/2010 | Netz | G06F 16/24561 |
| | | | | 707/E17.014 |
| 2014/0201129 | A1 * | 7/2014 | Gupta | G06F 16/2237 |
| | | | | 707/602 |
| 2014/0379693 | A1 * | 12/2014 | May | G06F 16/24542 |
| | | | | 707/718 |

(Continued)

OTHER PUBLICATIONS

Jia, Dan, et al., "Research of Database Query Technology Based on Hash Function", ICIDT 2012, Jeju, South Korea, Jun. 26-28, 2012, pp. 97-100.*

*Primary Examiner* — Robert Stevens

(57) ABSTRACT

A plurality of histograms are maintained with respect to a dataset. The dataset includes a plurality of data segments. In response to a query that includes a plurality of conditions ordered in an initial sequence, a plurality of corresponding rejection rates is determined for the plurality of conditions based at least in part on the plurality of histograms. The plurality of conditions are re-ordered according to the plurality of corresponding rejection rates associated with the plurality of conditions to form a reordered sequence for the plurality of conditions. The query is executed according to the reordered sequence of the plurality of conditions.

20 Claims, 12 Drawing Sheets

(56) References Cited

U.S. PATENT DOCUMENTS

| | | | |
|---|---|---|---|
| 2015/0186464 A1* | 7/2015 | Seputis | G06F 16/24539 707/718 |
| 2015/0370857 A1* | 12/2015 | Nica | G06F 16/2465 707/752 |
| 2016/0110426 A1* | 4/2016 | Gaza | G06F 16/23 707/768 |

* cited by examiner

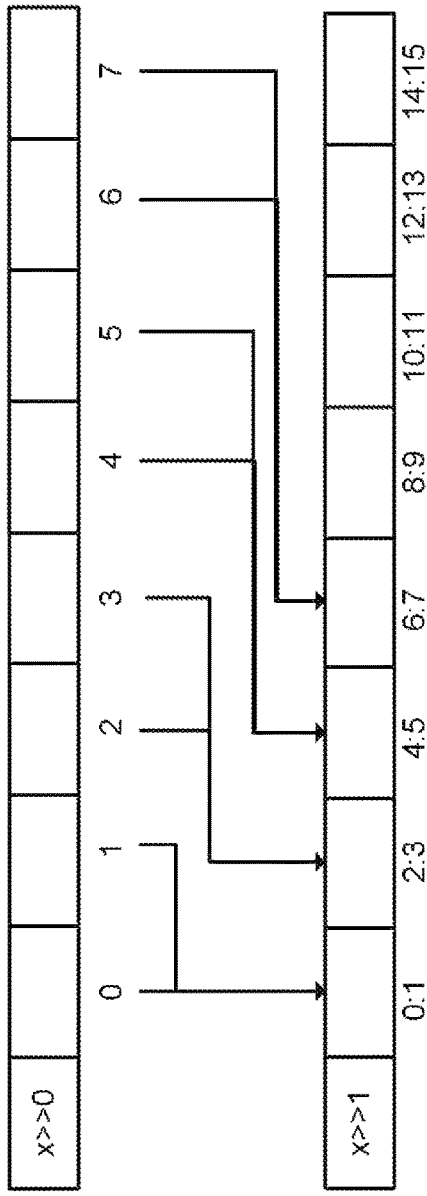
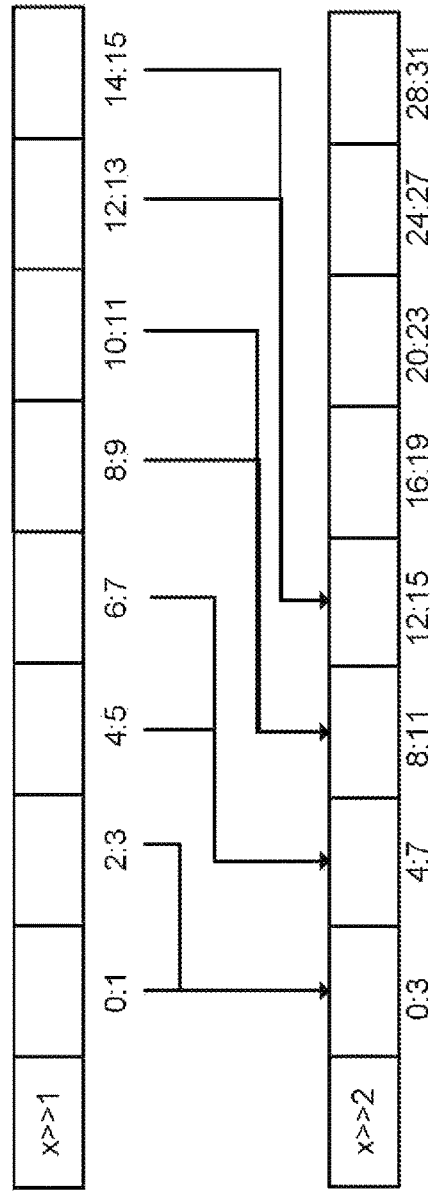

300

S1

| A | B | C | D | E |
|---|---|---|---|---|
| 1 | 20 | 30 | 40 | 1 |
| 9 | 20 | 30 | 41 | 1 |
| 10 | 20 | 30 | 42 | 1 |
| 10 | 20 | 30 | 43 | 1 |

S2

| A | B | C | D | E |
|---|---|---|---|---|
| 11 | 21 | 31 | 44 | 1 |
| 11 | 21 | 31 | 45 | 1 |
| 11 | 21 | 31 | 46 | 1 |
| 11 | 21 | 31 | 47 | 1 |

S3

| A | B | C | D | E |
|---|---|---|---|---|
| 12 | 22 | 32 | 48 | 1 |
| 12 | 22 | 32 | 49 | 1 |
| 12 | 22 | 32 | 50 | 1 |
| 12 | 22 | 32 | 51 | 1 |

FIG. 3A

| A | 0 | 1 | 2 | 3 | 4 | 5 | 6 | 7 |
|---|---|---|---|---|---|---|---|---|
| hash(x) |  | 2 | 2 | 4 | 4 |  |  |  |
| x>>1 | 1 |  |  |  | 1 | 6 | 4 |  |
|  | 0:1 | 2:3 | 4:5 | 6:7 | 8:9 | 10:11 | 12:13 | 14:15 |

| B | 0 | 1 | 2 | 3 | 4 | 5 | 6 | 7 |
|---|---|---|---|---|---|---|---|---|
| hash(x) |  |  |  |  | 4 | 4 | 4 |  |
| x>>2 |  |  |  |  |  | 12 |  |  |
|  | 0:3 | 4:7 | 8:11 | 12:15 | 16:19 | 20:23 | 24:27 | 28:31 |

| C | 0 | 1 | 2 | 3 | 4 | 5 | 6 | 7 |
|---|---|---|---|---|---|---|---|---|
| hash(x) | 4 |  |  |  |  |  | 4 | 4 |
| x>>3 |  |  |  | 8 | 4 |  |  |  |
|  | 0:7 | 8:15 | 16:23 | 24:31 | 32:39 | 40:47 | 48:55 | 56:63 |

| D | 0 | 1 | 2 | 3 | 4 | 5 | 6 | 7 |
|---|---|---|---|---|---|---|---|---|
| hash(x) | 2 | 2 | 2 | 2 | 1 | 1 | 1 | 1 |
| x>>3 |  |  |  |  |  | 8 | 4 |  |
|  | 0:7 | 8:15 | 16:23 | 24:31 | 32:39 | 40:47 | 48:55 | 56:63 |

| E | 0 | 1 | 2 | 3 | 4 | 5 | 6 | 7 |
|---|---|---|---|---|---|---|---|---|
| hash(x) |  | 12 |  |  |  |  |  |  |
| x>>0 |  | 12 |  |  |  |  |  |  |
|  | 0 | 1 | 2 | 3 | 4 | 5 | 6 | 7 |

FIG. 3B

DUAL FILTER HISTOGRAM OPTIMIZATION

CROSS REFERENCE TO OTHER APPLICATIONS

This application is a continuation application and claims the benefit and priority to co-pending U.S. patent application Ser. No. 16/266,985, entitled DUAL FILTER HISTOGRAM OPTIMIZATION filed on Feb. 4, 2019, which is a continuation of U.S. patent application Ser. No. 15/608,411, entitled DUAL FILTER HISTOGRAM OPTIMIZATION filed May 30, 2017, which is now issued as a U.S. Pat. No. 10,242,055, and which claims the benefit and priority to U.S. Provisional Patent Application No. 62/431,345 entitled DUAL FILTER HISTOGRAM OPTIMIZATION filed Dec. 7, 2016 which are all incorporated herein by reference in their entirety.

BACKGROUND OF THE INVENTION

In modern databases and related applications, a dataset can be comprised of hundreds, thousands, even millions of rows. A query of the dataset can be comprised of one or more query conditions. The dataset columns associated with the one or more query conditions are scanned to find one or more rows that satisfy the one or more query conditions. This process can require significant amounts of computer processing unit (CPU) resources and consume high amounts of electricity when the amount of data queries to be processed is large. The amount of time to perform a query can increase significantly when multiple queries of the dataset are performed. As a result, users can be frustrated and impatient because the query is too slow. Additional CPUs can be added to reduce the amount of time to perform a dataset query, but adding additional CPUs increases the costs of maintaining the dataset. It would be useful to reduce the CPU costs while also reducing the amount of time to perform a dataset query.

BRIEF DESCRIPTION OF THE DRAWINGS

Various embodiments of the invention are disclosed in the following detailed description and the accompanying drawings.

FIG. 1A is an example of a shift histogram according to some embodiments.

FIG. 1B is an example of a shift histogram according to some embodiments.

FIG. 1C is an example of a shift histogram according to some embodiments.

FIG. 3A is an example of a dataset according to some embodiments.

FIG. 3B is an example of a hash histogram and a shift histogram according to some embodiments.

DETAILED DESCRIPTION

Figure 2:
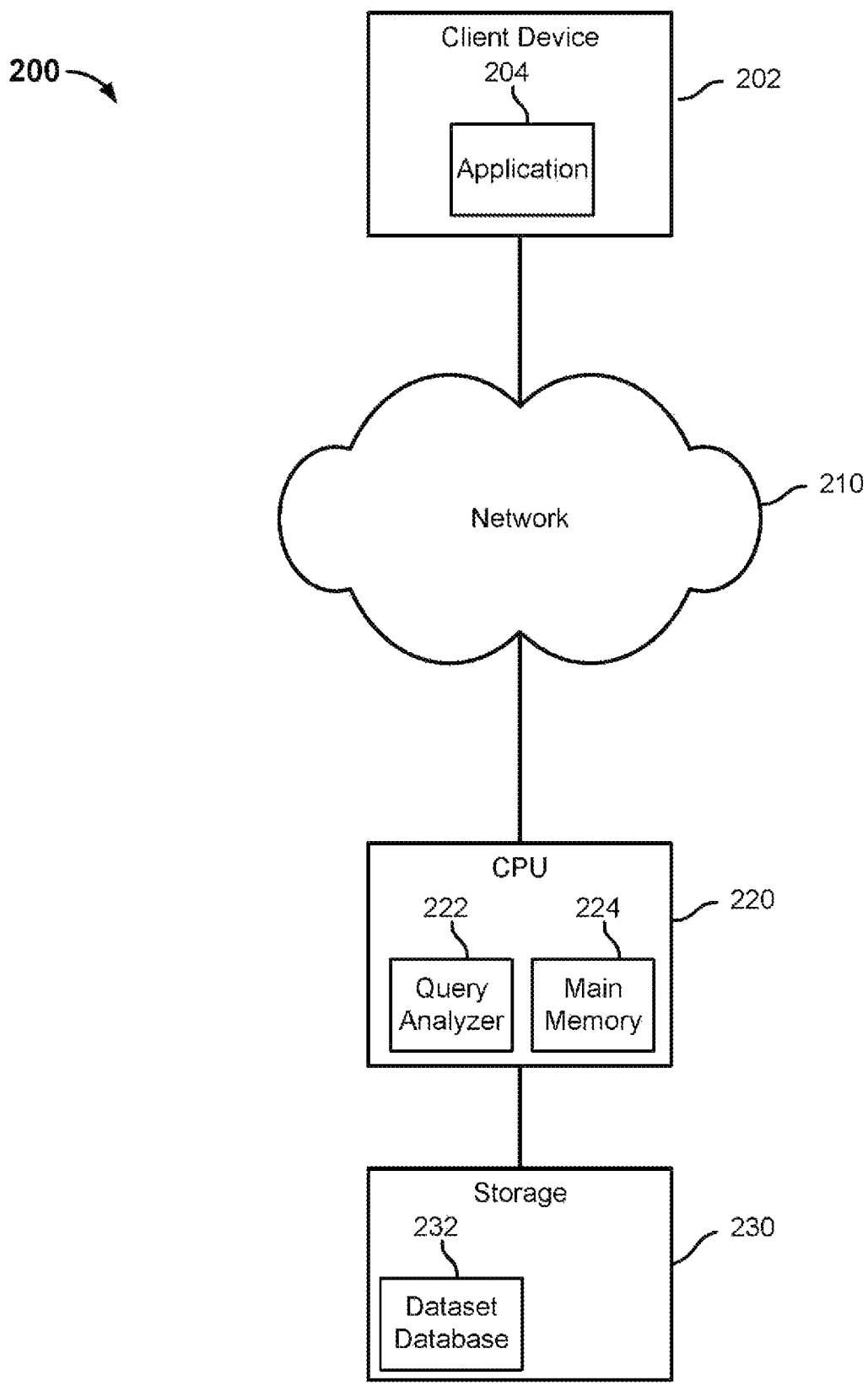
FIG. 2 is a block diagram illustrating an embodiment of a system for performing a database query.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to reduce the CPU costs, amount of CPU resources, and the time required to perform a dataset query is disclosed. A dataset is comprised of 1 rows and n columns. In the examples shown herein, a row can correspond to a data record such as an account, a person, an entity, etc. A column can correspond to a set of data values of a particular type, such as city, age, temperature, etc. A dataset query can be comprised of one or more query conditions pertaining to data in one or more columns. In conventional database systems, a CPU is configured to execute a query in the order the one or more query conditions are presented.

For example, for a dataset comprised of columns A, B, C, and D and multiple rows, a dataset query can have an initial sequence of: "A=12 AND B=22 AND D=49." The CPU will first search the A column for a row with a value of "12." For a row where "A=12," the CPU will subsequently determine if the B column of the row has a value of "22." If the A column of the row has a value of "12" and the B column of the row has a value of "22," the CPU will subsequently determine if the D column of the row has a value of "49." Such a query can cause the CPU to expend a tremendous amount of resources and require a significant amount of time to perform.

In some instances, performing a dataset query in the order of query conditions as presented by a query user is not the most efficient way to perform the dataset query. For example, the dataset may include only one row where "D=49," but hundreds of rows where "A=12" and "B=22." Instead of performing the query as described above, it is more efficient to first search the D column for a row where there is a value of "49," then for a row where "D=49," determine if the A column of the row has a value of "12." If the D column of the row has a value of "49" and the A column of the row has a value of "12," the CPU can subsequently determine if the B column of the row has a value of "22." It is more efficient to perform a dataset query in this manner because the CPU inspects a fewer number of rows to find a row that satisfies the query.

The reduced number of inspected rows can decrease the amount of resources and amount of time to perform a dataset query.

The disclosed technique separates the 1 rows into a plurality of m segments. A segment of the plurality of m segments is comprised of one or more rows. For example, a segment may be comprised of 65K rows. A plurality of hash histograms and a plurality of shift histograms are maintained for the dataset. A plurality of hash bit masks and a plurality of shift bit masks are maintained for each segment.

Each column of the dataset has a corresponding hash histogram. In this example, a hash histogram is comprised of N buckets, where each bucket corresponds to a hash value of a hash function (e.g., bucket 0 corresponds to a hash value of 0, bucket 1 corresponds to a hash value of 1, etc.). A bucket value of the hash histogram corresponds to the number of times a value in a column of the dataset is hashed to that bucket. In some embodiments, the number of buckets N is a power of two. In the examples below, N is chosen to be 8. Other values can be used. The hash function can be a modulo (%) function, but any appropriate hash function can be implemented.

A shift histogram is also comprised of N buckets. Each column of the dataset has a corresponding shift histogram. A column has a range of values. The shift histogram illustrates the distribution of values for the column. Each bucket of the shift histogram corresponds to a subset of the range of values. The numerical value of a bucket indicates the number of values of a column that fall within a specific bucket range. Initially, the histogram shift i=0 and the range of each bucket corresponds to a single value. i is the number of times the buckets of the shift histogram need to be collapsed to accommodate a value of x. However, as the range of values for a column exceeds the numerical value of $(2^{t*N})-1$, a "value>>i" function can be computed and the buckets of the shift histogram can be collapsed (e.g., combined) and new buckets can be added to the shift histogram in order to accommodate the values that exceed the numerical value of $(2^{t*N})-1$. N/2 buckets are added to the shift histogram to ensure that there are N buckets after the buckets of the shift histogram are collapsed. The range for an added bucket is equal to the range for a collapsed bucket.

A bucket is collapsed by combining itself with one or more adjacent buckets. For example, for a shift histogram comprised of 8 buckets, buckets 0 and 1 are combined, buckets 2 and 3 are combined, buckets 4 and 5 are combined, and buckets 6 and 7 are combined. Four new buckets are added to the shift histogram to maintain 8 buckets. In the examples described herein, two adjacent buckets are collapsed to form a new, combined bucket. Different numbers of buckets can be combined in other embodiments.

The "value>>shift" function indicates a current maximum value that the shift histogram can accommodate. If a column includes a value that is larger than the current maximum value that the shift histogram can accommodate, then the buckets of the shift histogram need to be adjusted to accommodate the value. In some embodiments, the buckets are collapsed multiple times to accommodate a value x until $x<(2^{t*N})-1$.

FIGS. 1A, 1B, and 1C are examples of a shift histogram. For example, suppose the number of buckets is N=8. Initially, as depicted in FIG. 1A, the range of each bucket of the shift histogram (i.e., x>>0) is a single value. If a column of a dataset includes a value between 0 and 7, a counter of the bucket corresponding to the value is increased by 1.

If the range of values for a column exceeds N−1, then a "value>>i" function, as depicted in FIG. 1B, is computed and neighboring buckets of the shift histogram are collapsed (e.g., combined) and N/2 buckets are added to the shift histogram. Each time the buckets are collapsed, the value of i is incremented by 1 (i.e., from "x>>0" to "x>>1").

Suppose a column includes a value x=10. To accommodate x=10 and keep the same number of buckets, the original buckets are collapsed (e.g., adjacent buckets are combined in pairs) and N/2 buckets are added. Specifically, as depicted in FIG. 1B, the original buckets 0 and 1 are combined to form a new bucket 0, the original buckets 2 and 3 are combined to form a new bucket 1, etc.

Suppose a column includes a value x=20. Since 20>$(2^1*8)-1$, the range of the buckets need to collapse a second time (i.e., "x>>2") and N/2 buckets are added to the shift histogram to accommodate a value x=20. This shift is depicted in FIG. 1C.

A corresponding histogram hash value and a corresponding histogram shift value associated with the plurality of query conditions can be determined. The histogram hash value indicates a number of rows of a column that have the same hash value as the query condition. The histogram shift value indicates a number of rows of a column that are in the same range bucket as the query condition.

A rejection rate for a query condition can be computed based on the smaller of a corresponding histogram hash value and corresponding histogram shift value. The rejection rate estimates the probability that a column does not include a value corresponding to a query condition. The rejection rate for a query condition can be computed as:

$$\text{rejection rate} = \frac{\text{Total \# of Rows} - (\text{Smaller of Histogram Hash Value and Histogram Shift Value})}{\text{Total \# of Rows}} \times 100\%$$

The initial sequence of the query can be re-ordered based on the rejection rate associated with each of the query conditions. The re-ordered query can start with a query condition with the highest rejection rate to the lowest rejection rate.

The histogram hash value helps to identify query conditions comprised of single values (e.g., B=20) with high rejection rates because the dataset may be comprised of a few values with the same hash value as the query condition. The shift histogram helps to identify query conditions comprised of a range of values (e.g., 32<C<37) with high rejection rates because the dataset may be comprised of a few values that fall within the same range of values as the query condition.

A query can be executed based on the re-ordered query. One or more rows that match the query conditions can be processed. The re-ordered query reduces the number of comparisons per row performed by a CPU and as a result, decreases the amount of resources, the amount of time to perform a dataset query, and the CPU cost.

In some embodiments, the query can be executed by comparing the hash bit mask associated with a query condition (also referred to as the query condition hash bit mask) to a hash bit mask associated with a segment (also referred to as the segment hash bit mask) to determine if there is a match. A match indicates that a segment may include a row that matches the query. Lack of a match indicates that a segment does not include a row that matches the query and the segment can be skipped.

A segment hash bit mask indicates whether the segment includes a row with a particular hash value. For example, if the number of buckets is N=8 where a modulo hash function is used, and the hash bit mask of a segment is "01100000," then the segment includes values with hash values of "1" and "2." Each bit of the hash bit mask corresponds to a bucket of the hash histogram. For example, the most left bit ("0") corresponds to the "0" (0-th) bucket, the second most left bit ("1") corresponds to the "1" ($1^{st}$) bucket, the third most left bit ("1") corresponds to the "2" ($2^{nd}$) bucket, the fourth most left bit ("0) corresponds to the "3" ($3^{rd}$) bucket, etc. Suppose a query condition includes a value that has a hash value of "1," (e.g., "A=1," "A=9," etc.). Since a hash value of "1" corresponds to the "1" bucket, then the hash bit mask for the query condition is "01000000." A match would exist because the "1" bit of the query condition hash bit mask matches one of the "1" bits of the segment hash bit mask of "01100000." Suppose a query condition includes a value that has a hash value of "3," (e.g., "A=3," "A=11," etc.). Since a hash value of "3" corresponds to the "3" bucket, then the hash bit mask for the query condition is "00010000." A match would not exist with the segment hash bit mask of "01100000" because the "1" bit of this query condition hash bit mask does not match any of the "1" bits of the segment hash bit mask. When the CPU is executing the query, in the event a match does not exist between the query condition hash bit mask and the segment hash bit mask, the segment and its associated rows can be skipped. This also reduces the amount of resources and amount of time to perform a dataset query because one or more segments (i.e., groups of rows) can be skipped by the CPU.

FIG. 2 is a block diagram illustrating an embodiment of a system 200 for performing a dataset query. In the example shown, the system 200 includes a client device 202, a network 210, a CPU 220, and storage 230. Client device 202 includes an application 204. Application 204 is configured to receive a query from a user and to provide the query to CPU 220. The query can include one or more query conditions. CPU 220 includes a query analyzer 222 and main memory 224. In various embodiments, query analyzer 222 can be part of CPU 220 or a separate piece of software, hardware, and/or combination of software and hardware that analyzes the query received by application 204. Main memory 224 can be memory that is implemented in the CPU or very close to the CPU. Storage 230 can refer to a solid state drive, a hard disk drive, or any other long term storage. Storage 230 includes a dataset database 232 that is configured to store a plurality of datasets.

In some embodiments, main memory 224 is configured to store an entire dataset (e.g., in-memory dataset). In other embodiments, main memory 224 is configured to store a portion of the dataset and storage 230 is configured to store the other portion of the dataset. In other embodiments, storage 230 is configured to store the entire dataset and to load into main memory 224 a portion of or a complete dataset.

CPU 220 can execute the query using data that is stored in main memory 224. In some embodiments, the data corresponding to a query condition is not stored in main memory 224 and CPU 220 is configured to retrieve the data corresponding to the query condition from storage 230. In some embodiments, to decrease the amount of time required to execute a query and to improve the performance of CPU 220, query analyzer 222 is configured to analyze the query before it is executed and to load data associated with a query condition into main memory 224.

Query analyzer 222 is configured to determine a corresponding rejection rate associated with the one or more query conditions. In some embodiments, a rejection rate refers to a percentage that indicates whether a query condition value will not be included in a particular column of a dataset. Query analyzer 222 is further configured to re-order an initial order of the one or more query conditions based on the rejection rates associated with the one or more query conditions. The one or more query conditions can be arranged from highest rejection rate to a lowest rejection rate.

For example, if a query is comprised of query conditions in the following order: "A=12" "B=22" and "D=49," query analyzer 222 will first search the A column for a row with a value of "12." For a row where "A=12," query analyzer 222 will subsequently determine if the B column of the row has a value of "22." If the A column of the row has a value of "12" and the B column of the row has a value of "22," query analyzer 222 will subsequently determine if the D column of the row has a value of "49." However, if the rejection rate associated with query conditions "A=12," "B=22," and "D=49" is 66%, 70%, and 83%, respectively, then the query can be re-ordered to be "D=49," "B=22," and "A=12" in the order of highest rejection rate to lowest rejection rate. This can reduce the amount of iterations of a dataset that query analyzer 222 needs to perform to find a row that matches the query.

In some embodiments, a query can be stopped if a query condition has a rejection rate of 100%. Modifying the above example, if the rejection rate associated with query conditions "A=12," "B=22," and "D=49" is 66%, 70%, and 100%, respectively, then the query can be re-ordered to be "D=49," "B=22," and "A=12." Without reordering the query, the query analyzer would perform the process as described above. By re-ordering the query conditions, the amount of CPU usage is reduced because the query analyzer would iterate through all the "D" rows and not have to inspect any "B" or "A" rows since the query analyzer cannot return a row that satisfies the query.

In some embodiments, in the event a query includes a query condition with a rejection rate less than 100% and some of the data associated with the query conditions is not loaded in main memory, some or all of the data associated with the query conditions not loaded in main memory is loaded from storage 230 into main memory 224 before the query is executed. This reduces the amount of time to execute a query because the data needed to perform the query does not need to be loaded into main memory while the query is being performed.

In some embodiments, in the event a query includes a query condition with a rejection rate of 100% and some of the data associated with the query conditions is not loaded in main memory, the data associated with the query conditions not loaded in main memory is not loaded from storage 230 into main memory 224. This prevents the CPU from unnecessarily loading data into memory.

FIG. 3A is an example of a dataset according to some embodiments. In some embodiments, at least a portion of dataset 300 can be stored in main memory of a CPU, such as main memory 224. In other embodiments, at least a portion of dataset 300 can be stored in storage, such as storage 230.

In the example shown, dataset 300 is comprised of segments S1, S2, and S3. Dataset 300 is also comprised of five columns with column headers of A, B, C, D, and E. Each cell of dataset 300 is comprised of a numerical value that corresponds to a query term. For example, column A can correspond to "Age" or "Year." Although only three segments and five columns are shown in the example, a dataset can be comprised of m segments and n columns, m and n being integers. Each cell of a dataset can also be comprised of any numerical value or a null value.

FIG. 3B is an example of a hash histogram and a shift histogram according to some embodiments. In the example shown, the values of the hash and shift histograms are based on dataset 300.

Hash Histogram

A hash histogram can be comprised of N buckets. In the example shown, the hash histogram is comprised of 8 buckets (numbered 0-7). A hash value is computed for each value of the dataset. The example implements a modulo (%) function, but any hash function can be implemented. A bucket value of the hash histogram corresponds to the number of times a hash value appears in the dataset. For example, the "A" column of dataset 300 has the following hash values: 1% 8 (e.g., 1 modulo 8)=1, 9% 8=1, 10% 8=2, 11% 8=3, and 12% 8=4. Column A has two instances of a hash value=1, two instances of a hash value=2, four instances of a hash value=3, and four instances of a hash value=4.

In the example shown, the "B" column has the following hash values: 20% 8=4, 21% 8=5, and 22% 8=6. Column B has four instances of a hash value=4, four instances of a hash value=5, and four instances of a hash value=6.

In the example shown, the "C" column has the following hash values: 30% 8=6, 31% 8=7, and 32% 8=0. Column C has four instances of a hash value=6, four instances of a hash value=7, and four instances of a hash value=0.

In the example shown, the "D" column has the following hash values: 40% 8=0, 41% 8=1, 41% 8=2, 43% 8=3, 44% 8=4, 45% 8=5, 46% 8=6, 47% 8=7, 48% 8=0, 49% 8=1, 50% 8=2, and 51% 8=3. Column D has two instances of a hash value=0, two instances of a hash value=1, two instances of a hash value=2, two instances of a hash value=3, one instance of a hash value=4, one instance of a hash value=5, one instance of a hash value=6, and one instance of a hash value=7.

In the example shown, the "E" column has the following hash values: 1% 8=1. Column E has twelve instances of a hash value=1.

Shift Histogram

A column has a corresponding shift histogram. A shift histogram is also comprised of N buckets. In FIG. 3B, Columns A, B, C, D, and E have a corresponding shift histogram and the shift histograms are comprised of 8 buckets. Each bucket represents a range of values. The range of each bucket depends on the range of values of a column. Initially, in the example shown, each bucket corresponds to a value between 0 and 7. If the values of a column are $\leq (2^i * N) - 1$, then the buckets do not need to be collapsed and the value can be assigned to a bucket in the shift histogram. For example, column E includes twelve instances of "1." Since $1 \leq (2^0 * N) - 1$, then the buckets do not need to be collapsed and the shift histogram includes a value of 12 in the "1" bucket.

However, if at least one value of a column in a dataset is $>(2 t*N)-1$ where i is the number of times the buckets of the shift histogram have been collapsed to accommodate a value x, then a shift is required for that column. The amount of shift is based on a "value>>i" function. In some embodiments, the "value>>i" function is $(2 t*N)-1$ where i is the number of times the buckets of the shift histogram need to be collapsed to accommodate a value x. For example, column A of dataset 300 includes some values that are $>(2^0*8)-1$, but $<(2^1*8)-1$. As a result, the existing buckets collapse to shift the range of each bucket and more buckets are added such that there are still N buckets. For example, the range for bucket 0 has changed from 0 to 0-1, the range for bucket 1 has changed from 1 to 2-3, the range for bucket 2 has changed from 2 to 4-5, the range for bucket 3 has changed from 3 to 6-7, etc. Four buckets are added to the shift histogram so that there are still N buckets, where N=8.

In the example shown, column B of dataset 300 includes values that are $>(2^1*8)-1$, but $<(22*8)-1$. As a result, the range of each bucket in the shift histogram is adjusted accordingly such that an equal range of values is allocated per bucket.

Figure 3C:
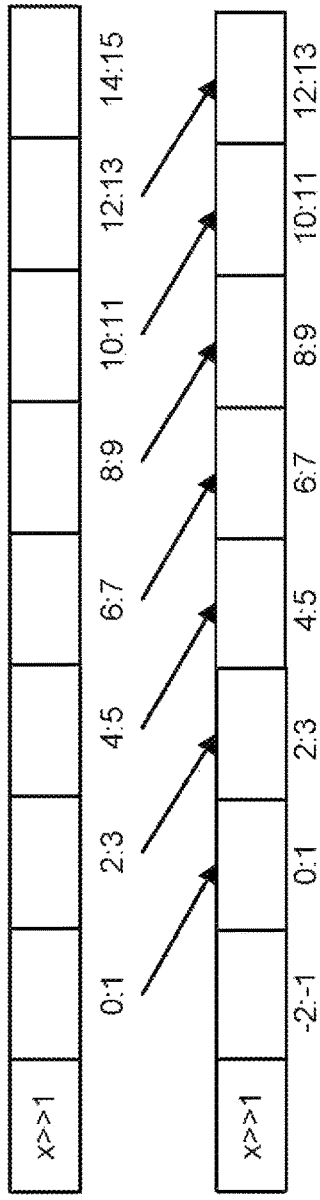
FIG. 3C is an example of a shift histogram according to some embodiments.

In some embodiments, in the event a value that is less than the minimum bucket is added to the dataset and the right most bucket is empty, then, as depicted in FIG. 3C, the right most bucket is dropped, a new left most bucket is added, and the range of values can be rotated and shifted up, i.e., the range of bucket 0 becomes the range of bucket 1, the range of bucket 1 becomes the range of bucket 2, etc. This allows the shift histogram to preserve specificity because the range of values for a bucket do not need to be collapsed (e.g., increased 2.times.) to accommodate a new dataset value.

Figure 3D:
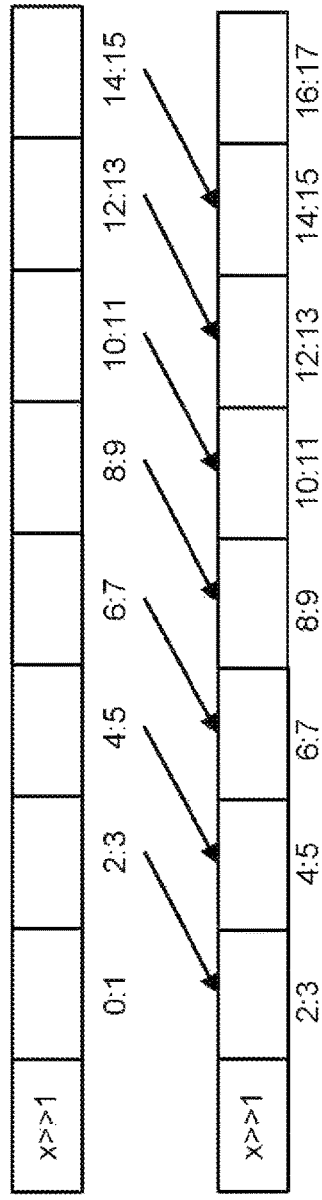
FIG. 3D is an example of a shift histogram according to some embodiments.

In some embodiments, in the event a value that is greater than the maximum bucket is added to the dataset and the left most bucket is empty, then, as depicted in FIG. 3D, the left most bucket is dropped, a new right most bucket is added, and the range of values can be rotated and shifted down, i.e., the range of bucket 7 becomes the range of bucket 6, the range of bucket 6 becomes the range of bucket 5, etc. This allows the shift histogram to preserve specificity because the range of values for a bucket does not need to be collapsed (e.g., increased 2.times.) to accommodate a new dataset value.

Figure 3E:
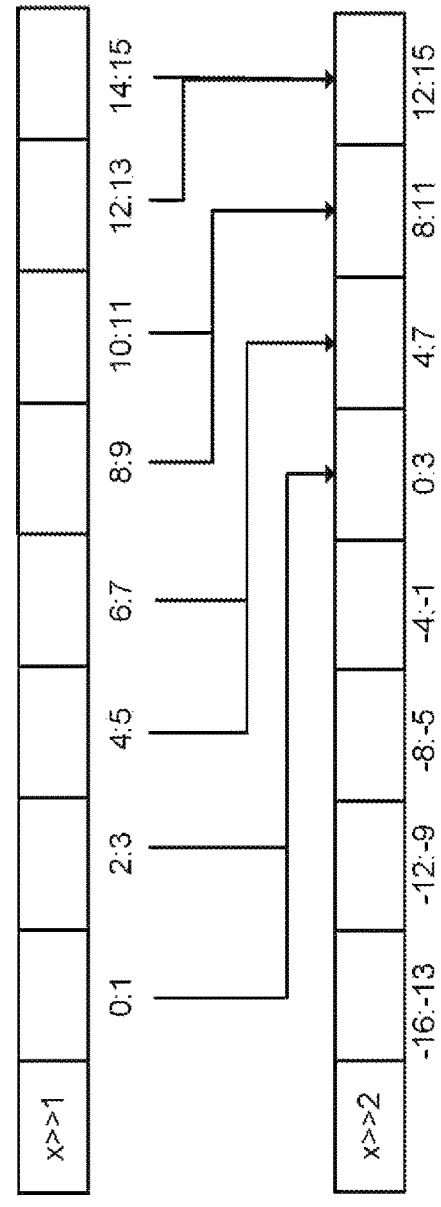
FIG. 3E is an example of a shift histogram according to some embodiments.
Figure 3F:
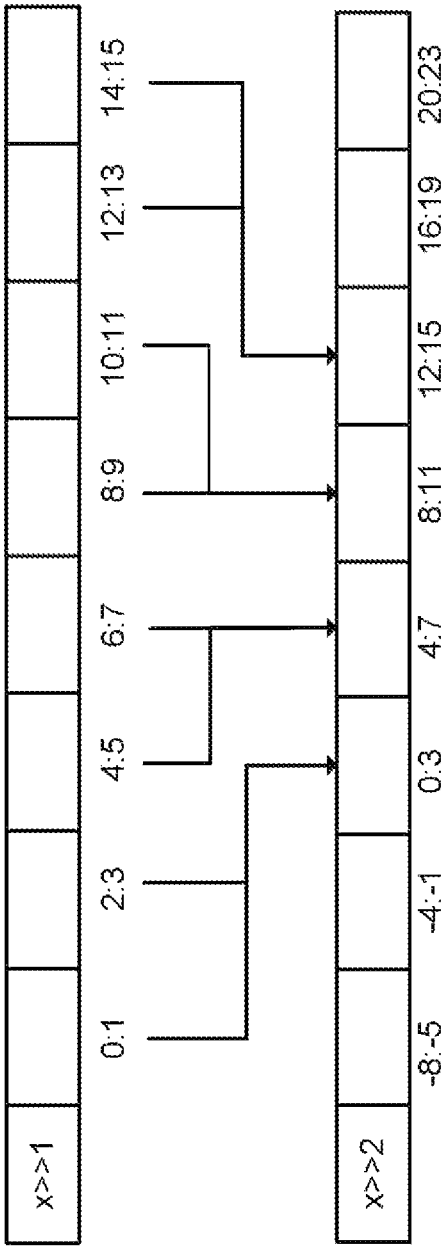
FIG. 3F is an example of a shift histogram according to some embodiments.

In some embodiments, a value can be added to a column that is less than the minimum value of the column or greater than the maximum value of the column. To accommodate the new value, the buckets are collapsed. Buckets can be added to either side of the collapsed buckets to accommodate the new value. In some embodiments, as depicted in FIG. 3E, buckets are collapsed and new buckets are added to the left side of the collapsed buckets. In other embodiments, as depicted in FIGS. 1B and 1C, buckets are collapsed and new buckets are added to the right side of the collapsed buckets. In other embodiments, as depicted in FIG. 3F, buckets are collapsed and new buckets are added to the left and right side of the collapsed buckets.

Figure 3G:
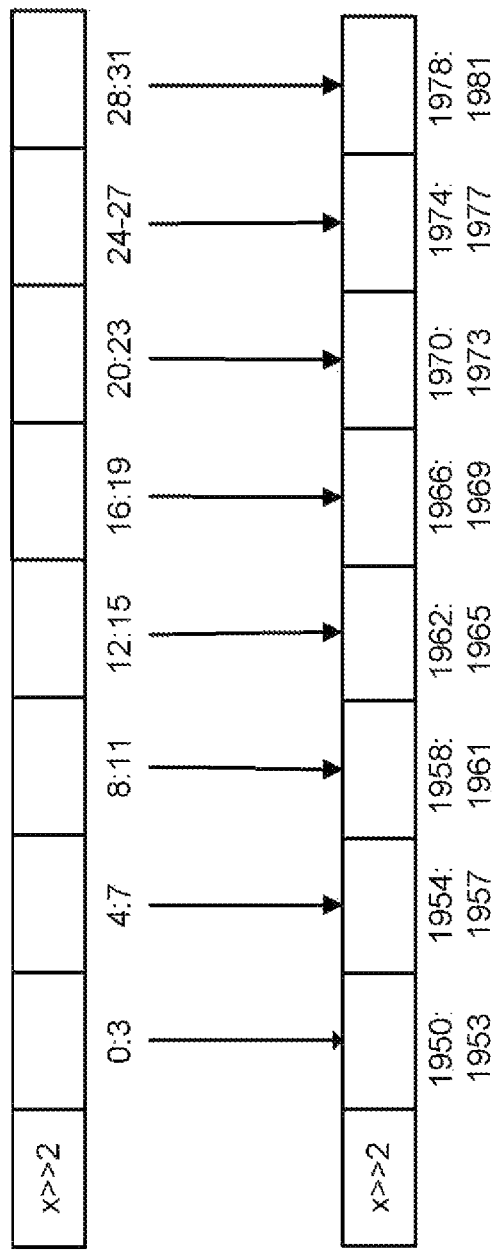
FIG. 3G is an example of a shift histogram according to some embodiments.

In other embodiments, a set of values for a column are clustered around a non-zero number. The range of the buckets of a shift histogram can be adjusted to accommodate the range of values of a column based on the set of values of the column such that the range of bucket 0 starts at a non-zero number. For example, the values of a column may correspond to birth year of non-millennial workers where the values of the column range between 1950 and 1981. If N=8 and an even range of years is distributed between buckets, then under the process of collapsing buckets and adding new buckets as described above, the range of bucket 0 is "0-252," the range of bucket 1 is "253-505," the range of bucket 2 is "506-758," the range of bucket 3 is "759-1011," the range of bucket 4 is "1012-1264," the range of bucket 5 is "1265-1517," the range of bucket 6 is "1518-1770," and the range of bucket 7 is "1771-2023." Since all of the birth years of the dataset will be in bucket 7, the usefulness of the shift histogram is limited because it lacks specificity. As depicted in FIG. 3G, the range of bucket 0 can be adjusted and begin at the earliest birth year. The range of the other buckets can be adjusted accordingly to accommodate an equal range of years between the buckets.

In some embodiments, a bucket j of the shift histogram of N buckets with a shift i value is configured to count the number of rows with numerical values greater than or equal to $j^{2^i}$ and less than $(j+1)^{2^i}$. A row with a value x can increase the bucket floor $(x/2^i)$.

Hash Bit Mask

A hash bit mask can be created for each segment. The hash bit mask indicates whether a bucket of the hash histogram has a value for a segment. The hash bit mask is updated when one of the rows of the segment is updated. For dataset 300, the hash bit masks for segment S1 are: A=01100000, B=00001000, C=00000010, D=11110000, and E=01000000. The column A values of segment S1 are 1, 9, 10, and 10. The hash values of 1 and 9 are 1, and the hash value of 10 is 2. The hash bit mask pattern of A for segment S1 is "01100000" because the second most left bit corresponds to bucket 1 and the third most left bit corresponds to bucket 2. The hash bit mask patterns for B, C, D, and E are determined in a similar manner.

Shift Bit Mask

A shift bit mask can be created for each segment. The shift bit mask indicates whether a bucket of the shift histogram has a value for a segment. The shift bit mask is updated when one of the rows of the segment is updated. For dataset 300, the column A values of segment S1 are 1, 9, 10, and 10. Since "9" and "10" are greater than "7," the buckets of the initial shift histogram are shifted, as depicted in FIG. 1B, to accommodate the values of "9" and "10." The segment values of 1, 9, and 10 are assigned to buckets 0, 4, and 5, respectively. Thus, the shift bit mask pattern of A for segment S1 is "10001100" because the most left bit corresponds to bucket 0, the fifth most left bit corresponds to the bucket 4, and the sixth most left bit corresponds to bucket 5. In the example shown, the other shift bit masks for segment S1 are: B=00000100, C=00010000, D=00000100, and E=01000000.

For dataset 300, the hash bit masks for segment S2 are A=00010000, B=00000100, C=00000001, D=00001111, and E=01000000. The shift bit masks for segment S2 are A=00000100, B=00000100, C=00010000, D=00000100, and E=01000000.

For dataset 300, the hash bit masks for segment S3 are A=00001000, B=00000010, C=10000000, D=11110000, and E=01000000. The shift bit masks for segment S3 are A=00000010, B=00000100, C=00001000, D=00000010, and E=01000000.

In some embodiments, the hash bit masks and the shift bit masks can be used to determine which segment a new dataset entry can be added. In other embodiments, when executing a query, the hash bit masks can be used to determine whether a segment matches a query condition. In other embodiments, when executing a query, the hash bit masks can be used to determine whether to skip an entire segment.

In other embodiments, a plurality of hash functions can be used and applied to the dataset, and corresponding hash histograms, shift histograms, hash bit masks, and shift bit masks can be maintained. Rejection rates can be computed based on each of the hash functions and corresponding hash and shift histograms.

Figure 4:
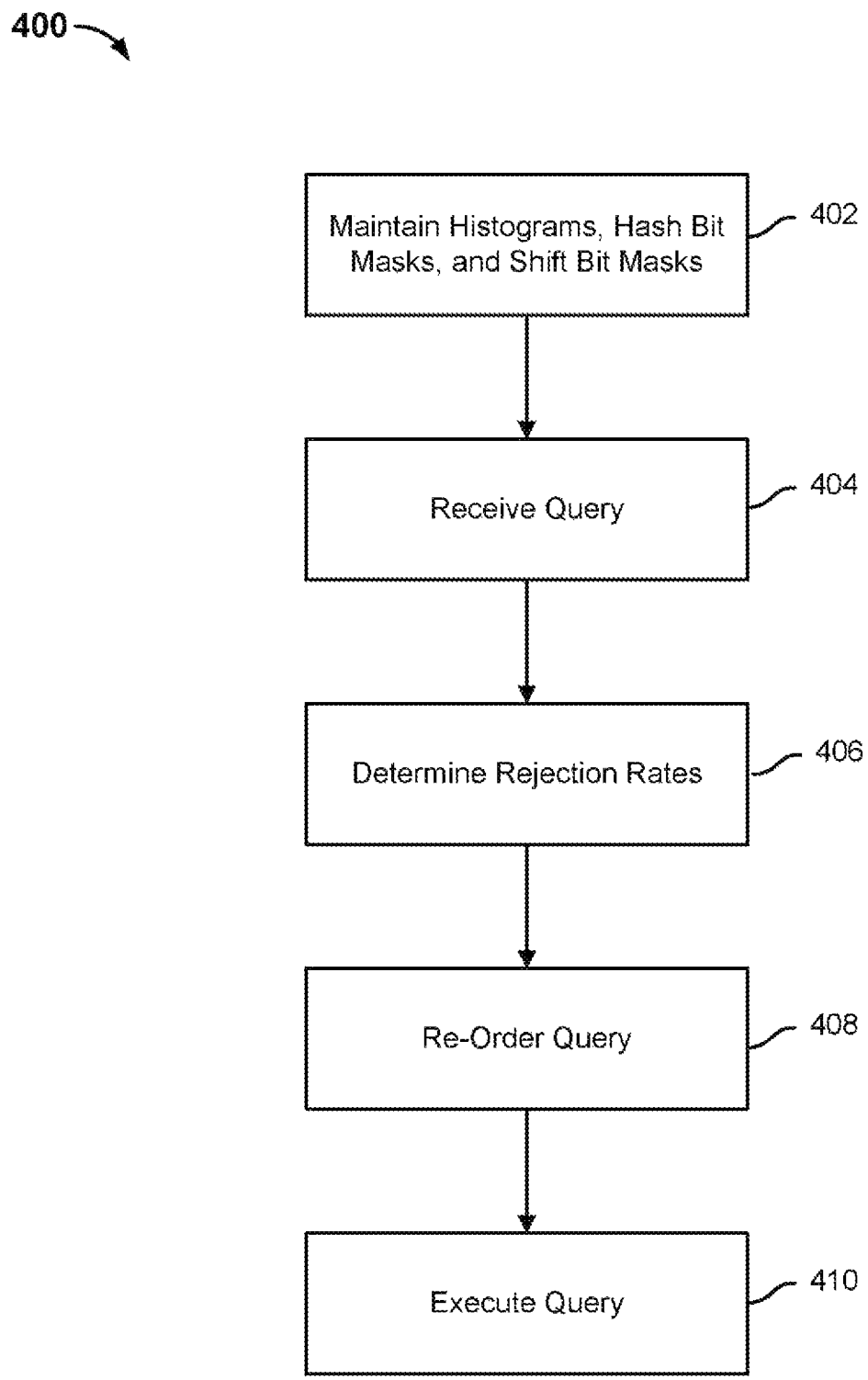
FIG. 4 is a flowchart illustrating an embodiment of a process for performing a database query.

FIG. 4 is a flowchart illustrating an embodiment of a process for performing a dataset query. In some embodiments, process 400 can be performed using a CPU, such as CPU 220.

At 402, histograms, hash masks, and shift masks associated with a dataset are maintained. A dataset includes m segments and n columns. A segment is comprised of one or more rows. Hash bit masks and shift bit masks are maintained for each segment of the dataset. The hash and shift bit masks of a segment are updated when a row of the segment is updated. A column can correspond to a query condition. A hash histogram and a shift histogram are maintained for each column of the dataset.

Adding a Row to the Dataset

In some embodiments, when the dataset is updated to include one or more rows of data, the hash histogram, shift histogram, and the hash and shift bit masks of a segment are updated to reflect the addition of the one or more rows of data. A row to be added includes values corresponding to the columns of the dataset. For example, suppose a row with the values of A=11, B=20, C=30, D=42, and E=1 is to be added to dataset 300. The values have a corresponding hash value. The buckets of the hash histogram and the shift histogram are updated based on the corresponding hash values and corresponding values of the row, respectively. For example, for a hash histogram with 8 buckets and using a modulo hash function, A=11 has a hash value of 3. The value of bucket 3 for the A hash histogram would increase by one. For the A values of dataset 300, A=11 corresponds to the bucket 5. The value of bucket 5 for the A shift histogram would increase by one.

The values have an associated hash bit mask and an associated shift bit mask. In the above example, the hash values of "A=1," "B=20," "C=30," "D=40," and "E=1" are 3, 4, 6, 2, and 1, respectively. The hash bit mask for "A=11" is "00010000" because the fourth most left bit corresponds to bucket 3. The other hash bit masks are: B=00001000, C=00000010, D=00100000, and E=01000000. For dataset 300, the "A=1," "B=20," "C=30," "D=40," and "E=1" correspond to buckets 5, 5, 3, 5, and 1, respectively. The shift bit mask for "A=11" is "00000100" because the sixth most left bit corresponds to bucket 5. The other shift bit masks are B=00000100, C=00010000, D=00000100, and E=01000000.

The row is added to a segment that introduces the least new bits to the segment's hash bit masks and shift bit masks.

Removing a Row from the Dataset

In other embodiments, when the dataset is updated to remove one or more rows of data, the hash histogram, shift histogram, and the hash and shift bit masks of a segment are updated to reflect the deletion of one or more rows of data. For example, suppose row 1 (i.e., "A=1," "B=20," "C=30," "D=40," and "E=1") of segment S1 of dataset 300 is deleted from the dataset. The buckets of the hash histogram and the shift histogram are updated based on the corresponding hash values and corresponding values of the row. For example, A=1 has a hash value of 1. The value of bucket 1 for the A hash histogram would decrease by one. For the values of dataset 300, A=1 corresponds to bucket 0. The value of bucket 0 for the A shift histogram would decrease by one.

The values of row 1 of segment S1 have an associated hash bit mask and an associated shift bit mask. For dataset 300, the hash values of "A=1," "B=20," "C=30," "D=40," and "E=1" are 1, 4, 6, 0, and 1, respectively. The hash bit mask for "A=1" is "01000000" because the second most left bit corresponds to bucket 1. The other hash bit masks for the values of row 1 are: B=00001000, C=00000010, D=10000000, and E=01000000. The A hash bit mask of segment S1 is unchanged even though row 1 is being deleted from the dataset because the segment still includes "A=9," which also has a hash bit mask "01000000." The B, C, and E hash bit masks of segment S1 also remain unchanged because the segment still includes other values with the same hash mask. The D hash bit mask of segment S1 changes from "11110000" to "01110000" because there are no other values in segment S1 that have a hash value of 0.

For dataset 300, the values of "A=1," "B=20," "C=30," "D=40," and "E=1" correspond to shift histogram buckets 0, 5, 3, 5, and 1, respectively. The shift bit mask for "A=1" is "10000000" because the most left bit corresponds to bucket 0. The other shift bit masks are B=00000100, C=00010000, D=00000100, and E=01000000. The A shift bit mask for segment S1 changes from "10001100" to "00001100" because there are no other values in segment S1 that correspond to bucket 0. The B shift bit mask, C shift bit mask, D shift bit mask, and E shift bit mask are unchanged because there are other values in segment S1 that still correspond to the buckets.

Modifying a Row of the Dataset

In other embodiments, when the dataset is updated to modify one or more rows of data, the hash histogram, shift histogram, and the hash and shift bit masks of a segment are updated to reflect the modification of one or more rows of data. For example, suppose one or more values of row 1 (i.e., "A=1," "B=20," "C=30," "D=40," and "E=1") of segment S1 of dataset 300 are modified (e.g., "A=2," "B=20," "C=31," "D=40," and "E=1"). The buckets of the hash histogram and the shift histogram are updated based on the corresponding hash values and corresponding values of the row. For example, "A=2" has a hash value of 2. The value of bucket 1 for the A hash histogram would decrease by one and the value of bucket 2 for the A hash histogram would increase by one. "C=31" has a hash value of 7. The value of bucket 6 for the C hash histogram would decrease by one and the value of bucket 7 for the C hash histogram would increase by one.

For the values of dataset 300, "A=2" corresponds to bucket 1. The value of bucket 0 for the A shift histogram would decrease by one and the value for bucket 1 for the A shift histogram would increase by one. For the values of dataset 300, "C=31" corresponds to bucket 3. The value of bucket 3 for the C hash histogram would remain unchanged because "C=30" and "C=31" both correspond to bucket 3.

The values of row 1 have an associated hash bit mask and an associated shift bit mask. For dataset 300, the hash values of "A=2," "B=20," "C=31," "D=40," and "E=1," and 1 are 2, 4, 7, 0, and 1, respectively. The hash bit mask for "A=2" is "00100000" because the third most left bit corresponds to bucket 2. The other hash bit masks for the values of row 1 are: B=00001000, C=00000001, D=10000000, and E=01000000. The A hash bit mask of segment S1 is unchanged even though row 1 is being modified from the dataset because the segment still includes values with a hash bit mask of "01000000" (e.g., A=9) and already includes values with a hash bit mask of "00100000 (e.g., A=10).

The B, D, and E hash bit masks of segment S1 also remain unchanged because the modifications to row 1 did not change the B, D, or E values. The C hash bit mask of the segment changes from "00000010" to "00000011" because the segment still includes values with a hash value of 6 (e.g., 30) and C=31 has a hash value of 7, which corresponds to the eighth most left bit.

For dataset 300, "A=2," "B=20," "C=31," "D=40," and "E=1" correspond to shift histogram buckets 1, 5, 3, 5, and 1, respectively. The shift bit mask for "A=1" is changed from "10001100" to "01001100" because the second most left bit corresponds to bucket 1. The shift bit mask for "C=31" remains unchanged from "00010000" because for the values of dataset 300, C=31 is also in bucket 3 of the shift histogram. The other shift bit masks remain unchanged because the other values did not change.

At 404, a query comprising one or more query conditions is received. For example, a query can comprise a search for people with an "age=25-30," "height=72 inches," and "zip code=12345." A query condition can be comprised of a numerical value, one or more range queries (e.g., age>25 AND age<30), and/or one or more words (e.g., city=Palo Alto). In some embodiments, the one or more words can be indexed to a number such that the number corresponds to a variable, such as city. For example, a dataset may include a column for "city" and each city in the dataset is assigned a number to refer to that city. "Palo Alto" can be assigned a value of "10" and "San Francisco" can be assigned a value of 20. A query with a query condition of "city=Palo Alto" would cause a query analyzer to search the "city" column for a value of "10."

At 406, a corresponding rejection rate associated with the query conditions is determined. A histogram hash value and a histogram shift value are determined for a query condition. The smaller value between the histogram hash value and the histogram shift value is determined. The rejection rate for a query condition can be computed according to equation (1).

At 408, the query is re-ordered based on the rejection rates. The query can be re-ordered starting with a query condition with the highest rejection rate followed by a query condition with the next highest rejection rate, and so forth.

At 410, a query is executed according to the re-ordered query conditions. The query can be performed using data stored in main memory (e.g., in-memory database). In other embodiments, data associated with a query condition that is not stored in main memory and is stored in high speed storage can be loaded into main memory before the query is executed.

Figure 5:
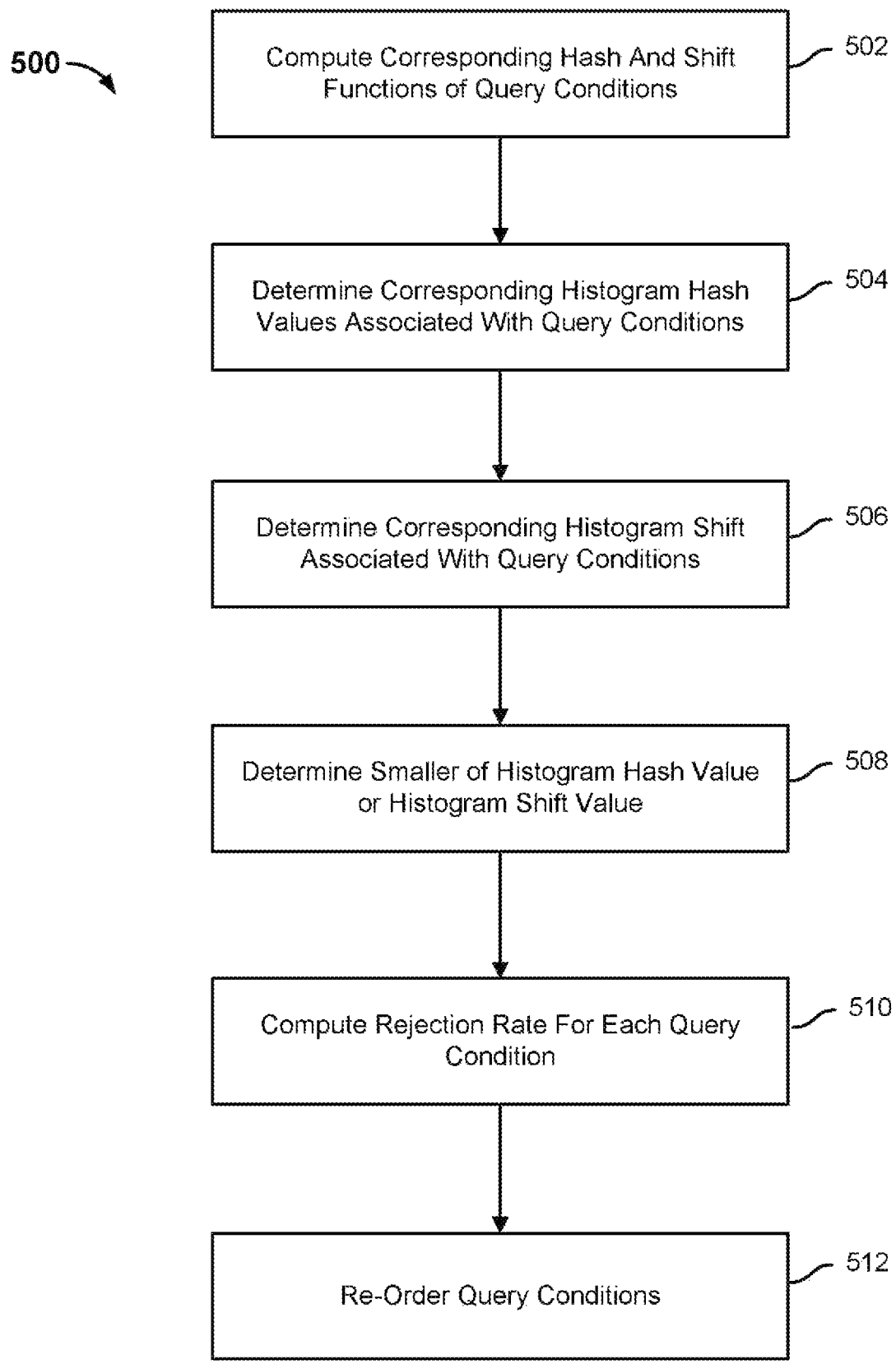
FIG. 5 is an example of an embodiment of a process for re-ordering query conditions of a search query.

FIG. 5 is an example of an embodiment of a process for re-ordering query conditions of a search query. In some embodiments, process 500 can be implemented by a query analyzer, such as query analyzer 222. In some embodiments, process 500 can be implemented to perform some or all of 408.

At 502, a corresponding hash function and a corresponding shift function are computed for the one or more query conditions. The hash function can be a modulo hash function or other type of hash function. The value of the hash function is based on the number of buckets. For example, the hash function implemented in FIG. 3B is a modulo hash function and the output of the modulo hash function is based on eight buckets.

The shift function is based on the range of values of a column. The shift histogram is comprised of N buckets. The span of values between buckets is equally distributed. For example, the range of values for column "D" of dataset 300 ranges from "40" to "51." To accommodate the range of values for the "D" column, the range of each bucket of the shift histogram was collapsed three times, such that each bucket is associated with a range of eight possible values for "D."

In some embodiments, a hash function and a shift function are computed for a query condition comprised of a numerical value (e.g., B=20). In other embodiments, a hash function and a shift function are computed for a query condition comprised of a range query (e.g., 30≤C≤32). The corresponding hash functions are computed for the numerical values of the range query (e.g., 30, 31, 32). In some instances the value of the range query falls within a single bucket. For example, as seen in FIG. 3B, the values associated with a range query of 30≤C≤32 fall within a single bucket (i.e., bucket 4) of the shift histogram.

At 504, corresponding histogram hash values associated with the query conditions are determined. A column of a dataset corresponds to a query condition and is comprised of one or more different values. Each value of the column has a corresponding hash function value. The hash histogram is comprised of N buckets, each bucket corresponding to a hash function value. The histogram hash value associated with a query condition is the number of values in the column that have the same hash function value as the query condition. For example, two values (1, 9) of Column A of dataset 300 have a hash function value of 1.

At 506, a corresponding histogram shift value associated with the query conditions is determined. A query condition is associated with a bucket with an associated range of values. The histogram shift value is the number of values of a column that fall into the same bucket as the query condition. For example, "D=45" of dataset 300 is associated with a bucket that has a range of "40-47." In the example shown in FIG. 3B, the histogram shift value for "D=45" is 8.

At 508, for each query condition, the smaller value between the corresponding histogram hash value and the corresponding histogram shift value is determined. For example, "A=1" of dataset 300 has a histogram hash value of "2" and a histogram shift value of "1." The smaller of the two values is "1." In contrast, "B=20" of dataset 300 has a histogram hash value of "4" and a histogram shift value of "12." The smaller of the two values is "4."

At 510, for each query condition, a rejection rate is computed. The rejection rate for a query condition can be computed according to equation (1).

At 512, the query conditions are re-ordered based on the rejection rates. The query can be re-ordered such that the first query condition is the query condition with the highest rejection, the next query condition is the query condition with the second highest rejection rate, and so forth.

Figure 6A:
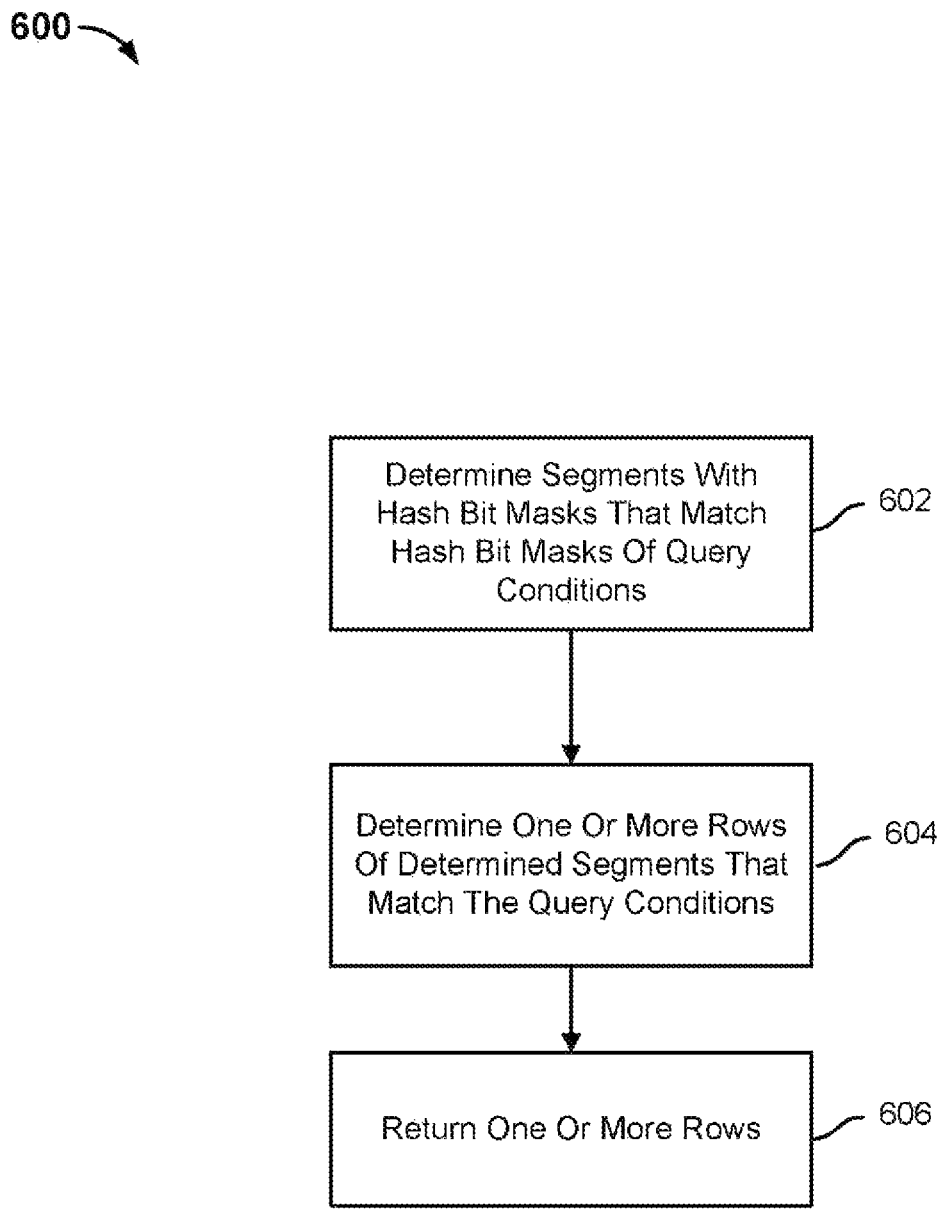
FIG. 6A is an example of an embodiment of a process for executing a query.

FIG. 6A is an example of an embodiment of a process for executing a query. In some embodiments, process 600 can be implemented by a CPU, such as CPU 220. In some embodiments, process 600 can be implemented to perform some or all of 410 of process 400.

At 602, segments with hash bit masks that match the hash bit masks associated with the one or more query conditions are determined. For example, suppose a query of dataset 300 is: "A=12 AND B=22 AND D=49." As discussed above, the query can be re-ordered to be "D=49 AND B=22 AND A=12." For dataset 300, A, B, and D have hash values of 4, 6, and 1, respectively. "A=12" has a hash bit mask of "00001000" because the fifth most left bit corresponds to bucket 4. "B=22" has a hash bit mask of "00000010," and "D=49" has a hash bit mask of "01000000."

The CPU can search through all the D segments to determine if a segment D hash bit mask matches the D=49 hash bit mask of "01000000." For a segment with a D hash bit mask of "01000000," the CPU can compare the "B=22" hash bit mask of "00000010" to the segment B hash bit mask. If there is a match, the CPU can compare the "A=12" hash bit mask of "00001000" to the A hash bit mask of the segment.

At 604, one or more rows of the determined segments that match the query conditions are determined. At 606, the one or more rows of the determined segments that match the query conditions are returned.

Figure 6B:
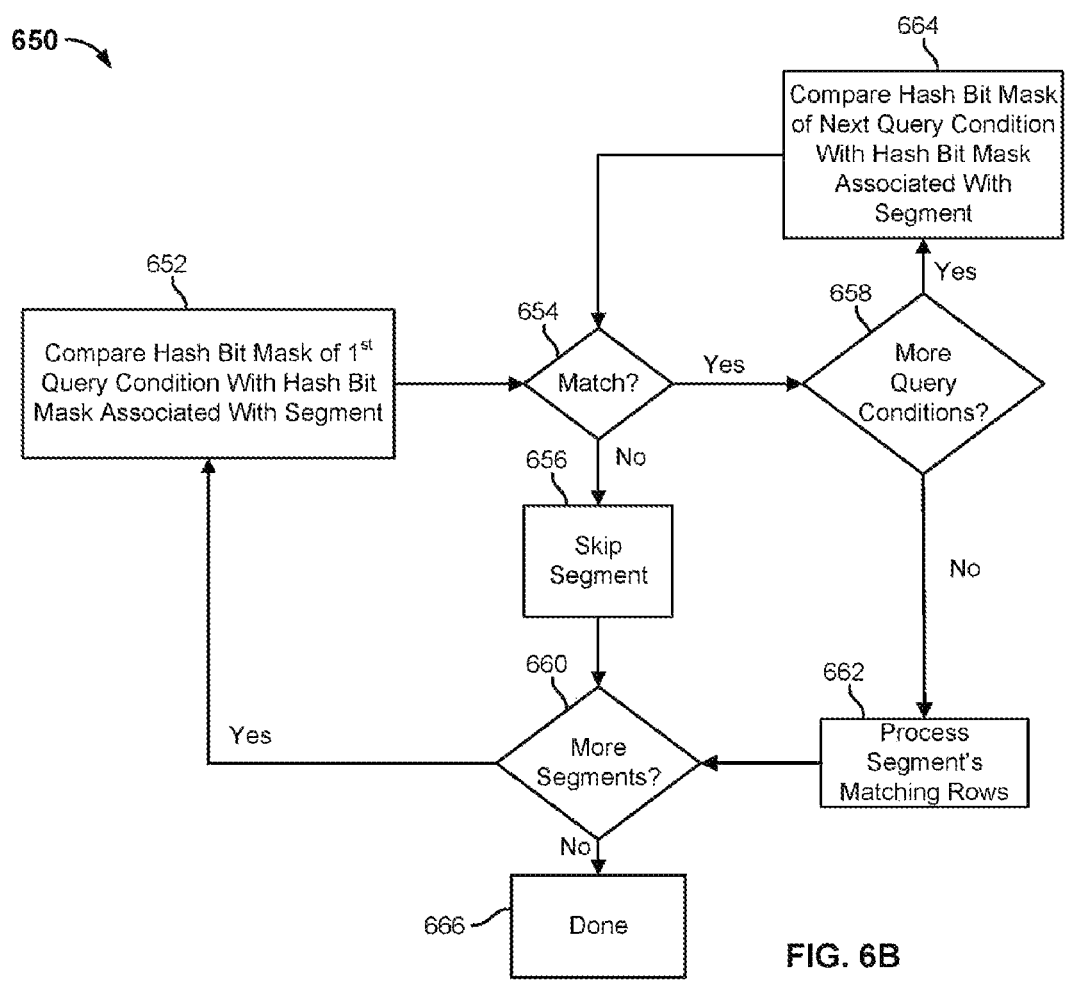
FIG. 6B is an example of an embodiment of a process for executing a query.

FIG. 6B is an example of an embodiment of a process for executing a query. In some embodiments, process 650 can be implemented by a CPU, such as CPU 220. In some embodiments, process 650 can be implemented to perform some or all of 410 of process 400.

At 652, a hash bit mask associated with a first query condition is compared to a corresponding hash bit mask associated with a segment. In this example, the query condition hash bit mask and the segment hash bit mask are constructed using the technique discussed above in connection with FIG. 3B. and process 400 of FIG. 4. For example, in dataset 300, a query condition of "D=49" has an associated hash bit mask of "01000000." S1 has a corresponding "D" hash bit mask of "11110000."

At 654, it is determined whether the hash bit mask associated with the first query condition matches the hash bit mask associated with a segment. A match exists if a bit of the hash bit mask associated with the first query condition is equal to 1 and a corresponding bit of a segment hash bit mask is also equal to 1. For dataset 300, a match exists between "D=49" and S1 because the values of the second bit from the left are both "1." In contrast, S2 has a D hash bit mask of "00001111." A match does not exist because the second most left bit value of the query condition hash bit mask value is "1" and the second most left bit value of the D hash bit mask of S2 is "0." In the event there is a match, the process proceeds to 658. In the event there is no match, the process proceeds to 656.

When there is no match, at 656, the segment is skipped. For example, S2 of dataset 300 is comprised of four rows. Since a match does not exist according to 654, the CPU does not need to inspect each of the rows in S2 to determine whether "D=49." This saves CPU usage because the CPU does not need to waste resources inspecting each of the rows in S2.

When there is a match, at 658, it is determined whether there are more query conditions. In the event there are more query conditions to evaluate, the process proceeds to 664. In the event there are no more query conditions to evaluate, the process proceeds to 662.

At 660, it is determined whether there are more segments of the dataset to inspect. In the event there are more segments, the process proceeds to 652 and the next segment of the dataset is inspected. In the event there are no more segments, the process proceeds to 666. and the process is ends.

At 662, the segment's matching rows are processed to determine one or more rows matching the query condition, if any, match the query.

At 664, the hash bit mask of the next query condition is compared to a hash bit mask associated with the segment.

For example, the hash bit mask of "B=22" is compared to the B hash bit mask associated with segment S1.

At 666, the process ends. In some embodiments, a notification indicating that a segment and/or a row of the dataset does not match the query can be returned.

Figure 6C:
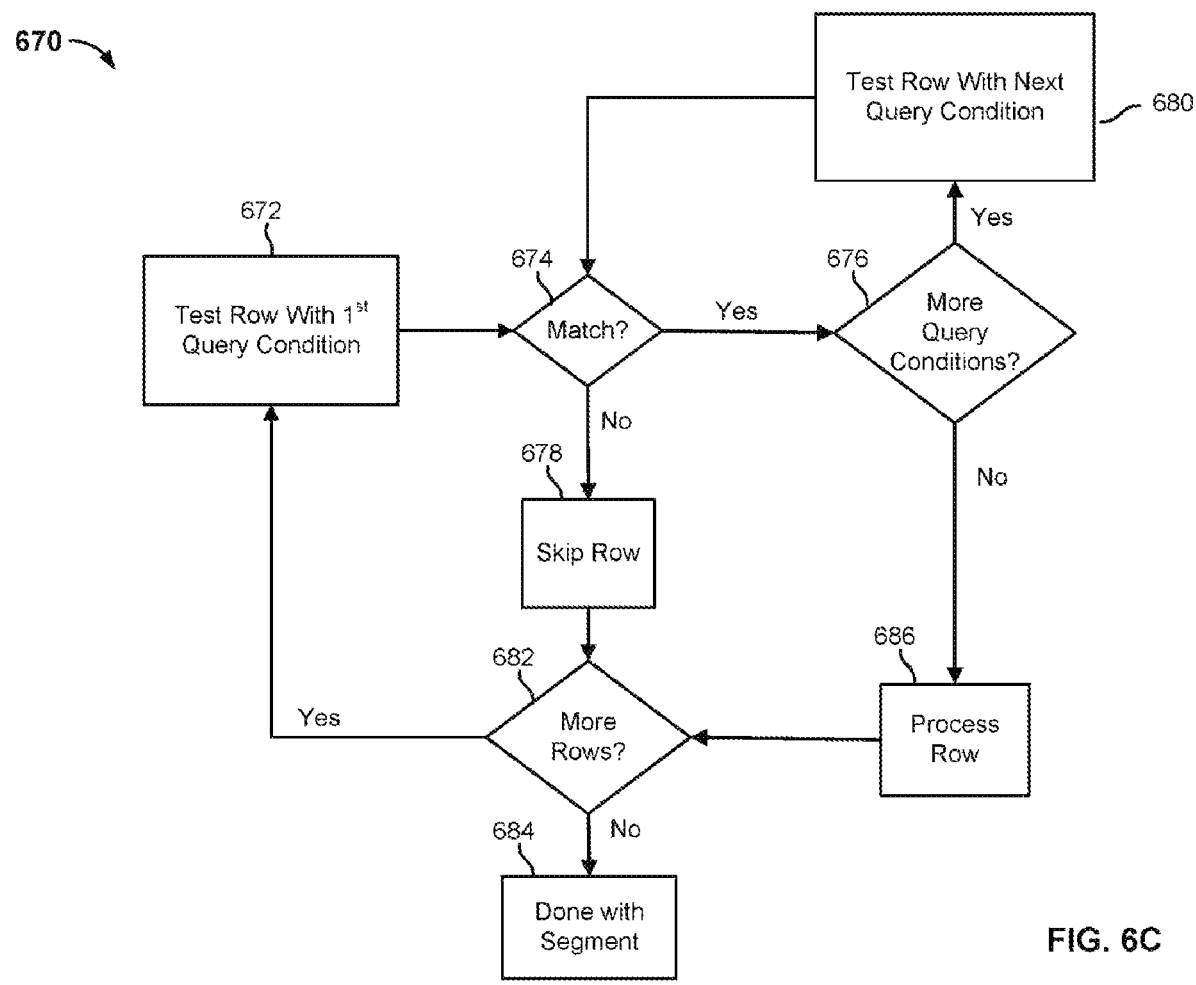
FIG. 6C is an example of an embodiment of a process for processing the rows of a segment.

FIG. 6C is an example of an embodiment of a process for processing the rows of a segment. In some embodiments, process 670 can be implemented by a CPU, such as CPU 220.

In some embodiments, process 670 can be implemented to perform some or all of 662 of process 650.

At 672, a row of a segment is tested with the first query condition. For example, for a query of "D=49 AND B=22 AND A=12," the "D" query condition is tested. At 674, it is determined whether there is a match between a value of the row and the query condition. For example, it is determined whether the "D" column value of the row is "49." In the event there is a match, process 670 proceeds to 676. In the event there is no match, process 670 proceeds to 678.

At 676, it is determined whether there are more query conditions. In the event there are more query conditions, process 670 proceeds to 680. In the event there are no more query conditions, process 670 proceeds to 686.

At 678, the row of the segment is skipped and process 670 proceeds to 682.

At 680, the row of the segment is tested with the next query condition. For example, for a query of "D=49 AND B=22 AND A=12," the "B" query condition is tested.

At 682, it is determined whether the segment includes more rows. In the event the segment includes more rows, process 670 proceeds to 672 where the next row of the segment is tested with the first query condition. In the event the segment does not include more rows, process 670 proceeds to 684 and the processing of the segment's matching rows is completed.

At 686, the row is processed. The rows can be processed by performing one or more of the following: returning the matching row, counting the number of matched rows, counting the number of matched rows where a particular column is not zero, aggregating the sum of the values of a particular column for all matched rows, and/or accumulating a collection of values of a particular column for all matched rows.

Figure 7:
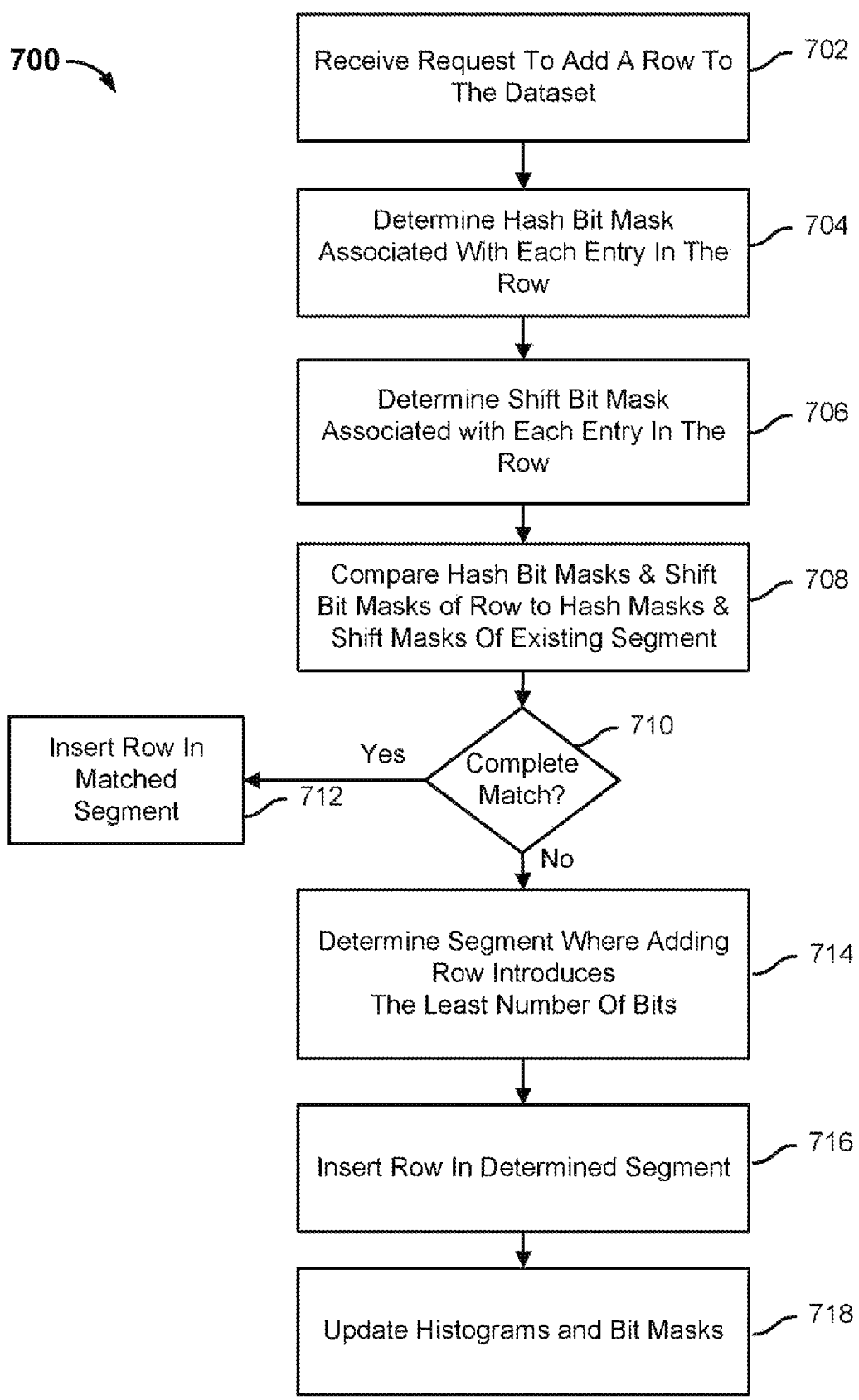
FIG. 7 is an example of an embodiment of a process for optimizing a location of a row being added to a dataset.

FIG. 7 is an example of an embodiment of a process for optimizing a location of a row being added to a dataset. In some embodiments, process 700 can be implemented by a CPU, such as CPU 220. In some embodiments, process 700 can be implemented to perform some or all of 402 of process 400. A dataset can be updated to include one or more additional rows of data. In order to maximize the effect of segment skipping of process 700, the one or more additional rows of data are added to segments that introduce the least new bits.

At 702, a request to add a row to a dataset is received. For example, a request to add a row with the value of "A=11," "B=20," "C=30," "D=42," and "E=1" can be received for dataset 300.

At 704, a hash bit mask associated with each entry in a row to be added is determined. For example, for dataset 300, the values of "A=11," "B=20," "C=30," "D=42," and "E=1" have a hash function value of 3, 4, 6, 2, and 1, respectively. Since a hash value of "3" corresponds to the bucket 3, the hash bit mask for A=11 is "00010000." The other hash bit masks are: B=00001000, C=00000010, D=00100000, and E=01000000.

At 706, a shift bit mask associated with each entry in a row to be added is determined. For example, for dataset 300, the values of "A=11," "B=20," "C=30," "D=42," and "E=1" are assigned to bucket 5 of A, bucket 5 of B, bucket 5 of C, bucket 5 of D, and bucket 1 of E, respectively. Thus, the shift bit mask pattern for "A=11" is 00000100 because the sixth most left bit corresponds to bucket 5. The other shift bit masks are B=00000100, C=00010000, D=00000100, and E=01000000.

At 708, the hash bit masks and the shift bit masks of the row to be added are compared to the hash bit masks and shift bit masks of existing segments. For example, the A hash bit mask (00010000), the B hash bit mask (00001000), the C hash bit mask (00000010), the D hash bit mask (00100000), and the E hash bit mask (01000000) of the row to be added are compared to the A bit mask (01100000), the B hash bit mask (00001000), the C hash bit mask (00000010), the D hash bit mask (11110000) and the E hash bit mask (01000000) of segment S1, respectively. The A shift bit mask (00000100), the B shift bit mask (00000100), the C shift bit mask (00010000), the D shift bit mask (00000100), and the E shift bit mask (01000000) of the row to be added are compared to the A shift bit mask (10001100), B shift bit mask (00000100), C shift bit mask (00010000), D shift bit mask (00000100), and E shift bit mask (01000000) of segment S1, respectively.

At 710, it is determined whether there is a complete match between the hash bit masks and the shift bit masks of the row to be added and the hash bit masks and shift bit masks of an existing segment. A complete match exists if the hash and shift bit masks of the row to be added match the corresponding hash and bit masks of a segment. A complete match does not exist if at least one of the hash and shift bit masks of the row to be added does not match the corresponding hash bit masks and the shift bit masks of a segment. For example, a row with the values "A=10," "B=20," "C=30," "D=42," and "E=1" would be a complete match for segment S1 because the hash and shift bit masks of the row match the corresponding hash and bit masks of segment S1. A row with the values "A=11," "B=20," "C=30," "D=42," and "E=1" would not be a complete match for segment S1 because at least one of the hash and shift bit masks of the row to be added does not match the corresponding hash bit masks and the shift bit masks of segment S1 (e.g., hash bit mask of A=11 (00010000) !=A hash bit mask of segment S1 (01100000). In the event there is a complete match for each of the hash bit masks and shift bit masks of the segment to be added, the process proceeds to 712. In the event there is not a complete match, the process proceeds to 714. At 712, the row to be added is inserted into a matched segment.

At 714, a segment where adding the row introduces the least number of bits to the hash bit masks and shift bit masks of a segment is determined. For example, a row with the values of "A=11," "B=20," "C=30," "D=42," and "E=1," if inserted into S1 would introduce one bit change (e.g., hash bit mask of A would change from 01100000 to 01110000), if inserted to S2 would introduce a total of three bit changes (e.g., hash bit mask of B would change from 00000100 to 00001100, hash bit mask of C would change from 00000001 to 00000011, hash bit mask of D would change from 00001111 to 00101111), and if inserted to S3 would introduce a total of six bit changes (e.g., hash bit mask of A would change from 00001000 to 00011000, hash bit mask of B would change from 00000010 to 00001010, hash bit mask of C would change from 10000000 to 10000010, shift bit mask of A would change from 00000010 to 00000110, shift bit mask of C would change from 00001000 to 00011000, and shift bit mask of D would change from 00000010 to 00000110). Thus, the row is determined to be added to segment S1.

At 716, the row to be added is inserted into the determined segment.

At 718, the hash histograms, shift histograms, hash bit masks of the determined segment, and the shift bit masks of the determined segment are updated to reflect the addition. For example, since "A=11," "B=20," "C=30," "D=42," and "E=1" have hash values of 3, 4, 6, 2, and 1, respectively, bucket 3 of the A hash histogram, bucket 4 of the B hash histogram, bucket 6 of the C hash histogram, bucket 2 of the D hash histogram, and bucket 1 of the E hash histogram, are increased by 1. Since "A=11," "B=20," "C=30," "D=42," and "E=1" correspond to buckets 5, 5, 3, 5, and 1, respectively, the values of bucket 5 of the A shift histogram, bucket 5 of the B shift histogram, bucket 3 of the C shift histogram, bucket 5 of the D shift histogram, and bucket 1 of the E shift histogram are increased by 1. Since adding the row with the values "A=11," "B=20," "C=30," "D=42," and "E=1" to segment S1 only adds one bit change, the hash bit mask of A is changed from "01100000" to "01110000."

A technique to perform a dataset query has been disclosed. Such a technique will reduce the amount of CPU resources and time required to perform the dataset query.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining a first hash value and a first shift value for a first query condition of a query;
    determining a second hash value and a second shift value for a second query condition of the query;
    determining a corresponding rejection rate for the first query condition and for the second query condition based on their corresponding hash values and the shift values;
    ordering the first query condition and the second query condition based on rejection rates associated therewith; and
    executing the query according to the ordering.

2. The method of claim 1, further comprising receiving the query comprising the first and the second query conditions.

3. The method of claim 1, wherein the first and the second hash values are determined based on a corresponding hash function.

4. The method of claim 3, wherein the corresponding hash function is computed for a query condition comprised of a single value.

5. The method of claim 3, wherein the corresponding hash function is computed for a query condition comprised of a range of values.

6. The method of claim 3, wherein the corresponding hash function is a modulo hash function.

7. The method of claim 1, wherein the first and the second shift values are determined based on a corresponding shift function.

8. The method of claim 7, wherein the corresponding shift function is computed for a query condition comprised of a single value.

9. The method of claim 7, wherein the corresponding shift function is computed for a query condition comprised of a range of values.

10. The method of claim 7, wherein the corresponding shift function for a query condition is based on a range of stored values associated with the query condition.

11. The method of claim 10, wherein the corresponding shift function is associated with a corresponding shift histogram, wherein the corresponding shift histogram is associated with a plurality of buckets, wherein the corresponding shift function is configured to modify a corresponding range associated with each of the plurality of buckets.

12. The method of claim 11, wherein the corresponding range associated with each of the plurality of buckets is based on the range of stored values associated with the query condition.

13. The method of claim 1, wherein the ordering is from a highest rejection rate to a lowest rejection rate.

14. The method of claim 1, wherein executing the query according to the ordering includes: determining that a hash bit mask associated with a condition of the ordering matches a corresponding hash bit mask of a data segment; and comparing a hash bit mask associated with a next condition of the ordering with a corresponding hash bit mask of the data segment.

15. The method of claim 1, wherein executing the query according to the ordering includes: determining that a hash bit mask associated with a condition of the ordering mismatch a corresponding hash bit mask of a data segment; and skipping the data segment.

16. The method of claim 1, wherein executing the query according to the ordering includes inspecting one or more data segments for one or more rows that match the query conditions of the ordered sequence.

17. A system, comprising:
    a processor configured to:
    determine a first hash value and a first shift value for a first query condition of a query;
    determine a second hash value and a second shift value for a second query condition of the query;
    determine a corresponding rejection rate for the first query condition and for the second query condition based on their corresponding hash values and the shift values;
    order the first query condition and the second query condition based on rejection rates associated therewith; and
    execute the query according to the order; and
    a memory coupled to the processor and configured to provide the processor with instructions.

18. The system of claim 17, wherein the processor is further configured to receive the query comprising a plurality of query conditions.

19. The system of claim 18, wherein the first query condition is a query condition having a highest rejection rate among the plurality of query conditions.

20. A computer program product, the computer program product being embodied in a non-transitory computer readable medium and comprising computer instructions for:
    determining a first hash value and a first shift value for a first query condition of a query;
    determining a second hash value and a second shift value for a second query condition of the query;
    determining a corresponding rejection rate for the first query condition and for the second query condition based on their corresponding hash values and the shift values;
    ordering the first query condition and the second query condition based on rejection rates associated therewith; and
    executing the query according to the ordering.

* * * * *